United States Patent
Fairlie et al.

[19]

[11] Patent Number: 6,146,518
[45] Date of Patent: Nov. 14, 2000

[54] PRESSURE DIFFERENTIAL CONTROL IN AN ELECTROLYTIC CELL

[75] Inventors: Matthew J. Fairlie; William J. Stewart; Charlie Dong, all of Toronto, Canada

[73] Assignee: Stuart Energy Systems Inc., Toronto, Canada

[21] Appl. No.: 09/387,829

[22] Filed: Sep. 1, 1999

[51] Int. Cl.[7] .................................................. C25B 15/02
[52] U.S. Cl. ........................ 205/335; 205/338; 205/339; 205/340; 205/343; 205/349; 205/628; 205/633; 205/637; 204/228.2; 204/228.4; 204/257; 204/263; 204/269; 204/275
[58] Field of Search ............................. 204/228.2, 228.4, 204/257, 263, 269, 275; 205/335, 338, 339, 340, 343, 349, 628, 633, 637

[56] References Cited

U.S. PATENT DOCUMENTS

| | | | |
|---|---|---|---|
| 5,733,422 | 3/1998 | Lin | 204/228.4 |
| 5,840,172 | 11/1998 | Zugravu | 205/335 |
| 5,951,842 | 9/1999 | Ueffinger | 205/335 |
| 6,080,290 | 6/2000 | Stuart et al. | 204/269 |

*Primary Examiner*—Bruce F. Bell
*Attorney, Agent, or Firm*—Farkas & Manelli PLLC

[57] ABSTRACT

An improved process for providing hydrogen from an electrolytic cell having an anolyte solution having an anolyte liquid level; a catholyte solution having a catholyte liquid level; generating oxygen at an oxygen pressure above the anolyte level; generating hydrogen at a hydrogen pressure above the catholyte level; the improvement comprising detecting at least one of the anolyte and the catholyte liquid levels as anolyte level and catholyte level data; feeding the level data to central processing means; determining the pressure differential between the levels from the level data, and pressure adjustment data by the central processing means; and providing the adjustment data to pressure control means to maintain the pressure differential within a selected range. The process offers a low cost method of controlling the pressure differential to within 2 cm WC of a set point.

22 Claims, 8 Drawing Sheets

PRESSURE DIFFERENTIAL CONTROL IN AN ELECTROLYTIC CELL

FIELD OF THE INVENTION

This invention relates to electrolytic cells, particularly to water electrolytic cells for the production of hydrogen and oxygen and more particularly, to control of the pressure differential across the cell membrane/separator.

BACKGROUND TO THE INVENTION

Electrosynthesis is a method for the production of chemical reaction(s) that is electrically driven by passage of an electric current, typically a direct current (DC), in an electrochemical cell through an electrolyte between an anode electrode and a cathode electrode from an external power source. The rate of production is proportional to the current flow in the absence of parasitic reactions. For example, in a liquid alkaline water electrolysis cell, the DC current is passed between the two electrodes in an aqueous electrolyte to split water, the reactant, into component product gases, namely, hydrogen and oxygen where the product gases evolve at the surfaces of the respective electrodes.

Water electrolysers have typically relied on pressure control systems to control the pressure between the two halves of an electrolysis cell to insure that the two gases, namely, oxygen and hydrogen produced in the electrolytic reaction are kept separate and do not mix.

In the conventional mono-polar cell design in wide commercial use today, one cell or one array of (parallel) cells is contained within one functional electrolyser, cell compartment, or individual tank. Each cell is made up of an assembly of electrode pairs in a separate tank where each assembly of electrode pairs connected in parallel acts as a single electrode pair. The connection to the cell is through a limited area contact using an interconnecting bus bar such as that disclosed in Canadian Patent No. 302,737, issued to A. T. Stuart (1930). The current is taken from a portion of a cathode in one cell to the anode of an adjacent cell using point-to-point electrical connections using the above-mentioned bus bar assembly between the cell compartments. The current is usually taken off one electrode at several points and the connection made to the next electrode at several points by means of bolting, welding or similar types of connections and each connection must be able to pass significant current densities.

Most filter press type electrolysers insulate the anodic and cathodic parts of the cell using a variety of materials that may include metals, plastics, rubbers, ceramics and various fibre based structures. In many cases, O-ring grooves are machined into frames or frames are moulded to allow O-rings to be inserted. Typically, at least two different materials from the assembly are necessary to enclose the electrodes in the cell and create channels for electrolyte circulation, reactant feed and product removal.

WO98/29912, published Jul. 9, 1998, in the name of The Electrolyser Corporation Ltd. and Stuart Energy Systems Inc., describes such a mono-polar cell electrolyser system configured in either a series flow of current, in a single stack electrolyser (SSE) or in a parallel flow of current in a multiple stack electrolyser (MSE). Aforesaid WO98/29912 provides details of the components and assembly designs for both SSE and MSE electrolysers.

As used herein, the term "cell" or "electrochemical cell" refers to a structure comprising at least one pair of electrodes including an anode and a cathode with each being suitably supported within a cell stack configuration. The latter further comprises a series of components such as circulation frames and gaskets through which aqueous electrolyte is circulated and product disengaged. The cell further includes a separator assembly having appropriate means for sealing and mechanically supporting the separator within the enclosure and an end wall used to separate adjacent cells blocks. Multiple cells may be connected either in series or in parallel to form cell stacks and there is no limit on how many cells may be used to form a stack. A cell block is a unit that comprises one or more cell stacks and multiple cell blocks are connected together by an external bus bar. Aforesaid PCT application WO98/29912 describes functional electrolysers comprising one or more cells that are connected together either in parallel, in series, or a combination thereof.

Depending on the configuration of such a cell stack electrochemical system, each includes an end box at each end of each stack in the simplest series configuration or a collection of end boxes attached at the end of each cell block. Alternative embodiments of an electrolyser includes end boxes adapted to be coupled to a horizontal header box when both a parallel and series combination of cells are assembled.

In the operation of the cell stack during electrolysis of the electrolyte, the anode serves to generate oxygen gas whereas the cathode serves to generate hydrogen gas. The two gases are kept separate and distinct by a low gas permeable membrane separator. Some desirable properties of separators include: high electrical resistivity, low ionic resistivity, low gas permeability, good mechanical integrity, and low cost.

The flow of gases and electrolytes within cells are conducted via circulation frames and gasket assemblies which also act to seal one cell component to a second and to contain the electrolyte in a cell stack configuration in analogy to a tank.

The rigid end boxes can serve several functions which include providing a return channel for electrolyte flowing out from the top of the cell in addition to serving as a gas/liquid separation device. The end box may also provide a location for components used for controlling the electrolyte level, such as, liquid level sensors and temperature, i.e. for example heaters, coolers or heat exchangers. In addition, with appropriate sensors in the end boxes individual cell stack electrolyte and gas purity may be monitored. Also, while most of the electrolyte is recirculated through the electrolyser, an electrolyte stream may be taken from each end box to provide external level control, electrolyte density, temperature, cell pressure and gas purity control and monitoring. This stream is returned to either the same end box or mixed with other similar streams and returned to the end boxes. Alternatively, probes may be inserted into the end boxes to control these parameters. An end box may also have a conduit to provide the two phase mixture to the existing liquid in the end box to improve gas liquid separation. End boxes of like type containing the same type of gas can be connected via a header such that they share a common electrolyte level.

One prior art pressure control system provides a water seal to equalize pressure in the two halves of the cell. This is the approach most often followed in "home-made" electrolysers. Typically, the water seal is a couple of inches deep and so the cell operates a couple of inches WC pressure above atmospheric.

An alternative system provides a membrane separator which can sustain a pressure difference between the two halves of the cell without gas mixing. The PEM cell is the best example of this type of system. The PEM cell can sustain up to a 2500 psi pressure difference without significant loss of gas purity.

A third is an active control system which senses pressure and controls the outflow of gases from the two cells. Control can be achieved in one of two ways: by a mechanical system which relies on pressure regulators, such as a dome-loaded flow regulator to control pressure between the two cells which, for example, might employ the oxygen pressure as a reference pressure to regulate the pressure in the hydrogen half of the cell; and by an electronic system which relies on measurement of the difference in gas pressure between the two cell to control the rates of gas outflow from the two sides of the cell so as to maintain a desired pressure difference of usually zero or with the hydrogen side slightly higher.

Typically, however, for very small commercial hydrogen generators (0.1 $Nm^3/h$) PEM type electrolysis cells are favoured. Although the cost of the cell is far higher than for alkaline electrolysers, these costs are more than offset by the controls needed for the alkaline systems using mechanical or electronic actuators, and by the need for higher pressures and, hence, compression in electrolysers using a water seal pressure control system.

Control systems that rely on mechanical actuators are difficult to calibrate and ensure "close to zero" pressure difference on a pressurized cell. In the case of a Stuart cell, one needs to ensure that the pressure difference doesn't force a level difference large enough to expose one side of the cell to the gas phase of the opposite side of the cell as this will reduce cell efficiency or may result in poor gas purity. Electrolysers that rely on mechanical actuators typically have a 1 atmosphere or so pressure difference between the two sides of the cell. Gas purity is maintained by, for example, a woven asbestos or a needle felted polyphenylene sulphide (PPS) membrane.

Control systems which rely on electronic actuators suffer from the weakness that in order to maintain level differences between the two sides in the cell within an inch of height, which is required to insure that the membrane is covered on both sides, sophisticated high resolution pressure measurements are needed. The demands of the measurement and control system are put in perspective when we consider controlling pressure to 2 cm WC in a cell pressurized to 7 bars or 7000 cm WC.

It would be advantageous to provide prior art electrolyser systems with a simple, low cost, in situ level control monitor that can be utilized for systems control. This would eliminate the need for complex, expensive pressure measuring systems that must retains their integrity in a hostile process environment of elevated temperature of, for example, 30–100° C. and concentrated alkali environments of, say, 20–40 wt. % KOH.

It is most important that the liquid levels pressure differential be maintained within well-defined limits in order to reduce the risk of intermixing of product gases, namely, hydrogen and oxygen across the membrane, and to ensure proper fluid management to permit safe and functional operation of the electrolysis cell.

However, there remains a need for a relatively low cost and reliable method of controlling pressure in a pressurized electrolyser.

SUMMARY OF THE INVENTION

It is an object of the present invention to provide a low cost method of controlling pressure between the anolyte and catholyte halves of the cell in a pressurized alkaline cell which is able to control the pressure difference between the parts of the cell to within ±2 cm WC of the set point.

In one aspect, the invention provides a method of controlling pressure between the oxygen and hydrogen compartments of an electrolytic cell, particularly a water electrolyser, between a desired range of pressure differential values, particularly below a selected maximum value, by detecting anolyte liquid level and/or catholyte liquid level to better than 2 cm. In consequence of the measured pressure differential, adjustment of the pressure of one compartment relative to another to bring the pressure differential within the accepted range is then carried out. In a preferred embodiment, continuous measurement of the pressure differential is made and fed to a controller having algorithmic control means which instruct a compensating means to be activated as required to provide the desired pressure differential. The compensating means may comprise, for example, a variable opening oxygen control valve which, on cell start-up, is set to provide a pre-set oxygen pressure. A pressure differential value which can include zero can be set and measured very precisely, preferably, to a fraction of a cm water column. The practice of the invention is of value in not being dependent on the absolute cell pressure set point. Control can be achieved to a specific pressure differential level difference.

Accordingly, in one aspect, the invention provides an improved process for providing hydrogen from an electrolytic cell having:

an anolyte solution having an anolyte liquid level;

a catholyte solution having a catholyte liquid level;

generating oxygen at an oxygen pressure above said anolyte level;

generating hydrogen at a hydrogen pressure above said catholyte level;

the improvement comprising (a) detecting at least one of said anolyte and said catholyte liquid levels as anolyte level and catholyte level data;

(b) feeding said level data to a central processing means;

(c) determining the pressure differential between said levels from said level data, and pressure adjustment data by said central processing means; and (d) providing said adjustment data to pressure control means to maintain said pressure differential within a selected range.

Most preferably, the aforesaid process continuously, sequentially carries out steps (a)–(d), wherein the pressure differential is submitted to an algorithmic treatment by the central processing means to determine the pressure adjustment data to better define the adjustment data.

By the term "continuous" is meant that the moment(s) any and all changes in liquid(s) level(s) is detected by the detection means, the change(s) is computed to provide instant action by the adjustment means. If safe operation is between set points A:B, then at A+Δx and A+Δx$^1$ where A<A+Δx, A+Δx$^1$<B, it may be desired that the controller takes no action, i.e. a deadband is permitted.

In one embodiment, a simple spring-loaded check valve controls the outflow from the oxygen side of the cell and maintains cell pressure at the value set by the check valve. The pressure of the check valve can be adjusted to set the maximum pressure needed in a particular application. On the hydrogen side, a variable flow control valve either opens or closes to regulate the flow of hydrogen gas from the outtake. The level of the electrolyte measured in the anode and cathode compartments determines the pressure difference between the two sides of the cell. The measured level difference is compared with a level difference set point and the error is used to adjust the setting of the hydrogen control valve.

In alternative embodiments according to the invention one or more of the liquid levels may be detected, for example, by optical sensing means, electrical or electromagnetic generation and sensing means, ultrasonic generation and sensing means or combinations, thereof.

The aforesaid methods of pressure control according to the invention are well suited for coupling electrolyser cells to a continuously operating compressor where gas pressure at the suction of the compressor is maintained by a recirculation loop connecting discharge to suction through a pressure regulator that maintains the suction at a constant elevated pressure.

The present invention can be used on single cells or on stacks of cells that use end boxes where-in the gas off-takes are located. Further, it can also be used on stacks of cells interconnected to form cell blocks by means of a header, wherein gas/liquid mixtures are discharged and the electrolyte level is controlled at some desired height.

Thus, the term "electrolytic cell" as used in this specification and claims includes the practice of the invention wherein the detection of the anolyte and/or catholyte levels is effected within the cell per se, end boxes and/or associated headers.

The present invention provides for cost effective alkaline pressurized water electrolysers that could be used in a host of energy and industrial applications and which does not require the use of water seals.

In a further aspect, the invention provides an improved electrolytic cell for the production of hydrogen comprising
  an anolyte solution having an anolyte liquid level;
  a catholyte solution having a catholyte liquid level;
  generated oxygen at an oxygen pressure above said anolyte level;
  generated hydrogen at a hydrogen pressure above said catholyte level;
  the improvement comprising
    (i) detection means for detecting at least one of said anolyte and said catholyte levels as anolyte level data and catholyte level data;
    (ii) central processing means;
    (iii) means for feeding said level data to said central processing means to determine the pressure differential between said levels from said level data, and pressure adjustment data; and
    (iv) pressure control means to receive said adjustment data and adjust at least one of said oxygen pressure and hydrogen pressure to maintain said pressure differential within a selected range.

In preferred embodiments, the electrolytic cell according to the invention comprises optical sensing means, electrical or electromagnetic generation and sensing means, ultrasonic generation and sensing means or combinations, thereof.

BRIEF DESCRIPTION OF THE DRAWINGS

In order that the invention may be better understood, preferred embodiments will now be described by way of example only, with reference to the accompanying drawings, wherein.

DETAILED DESCRIPTION OF PREFERRED EMBODIMENTS

Figure 1:
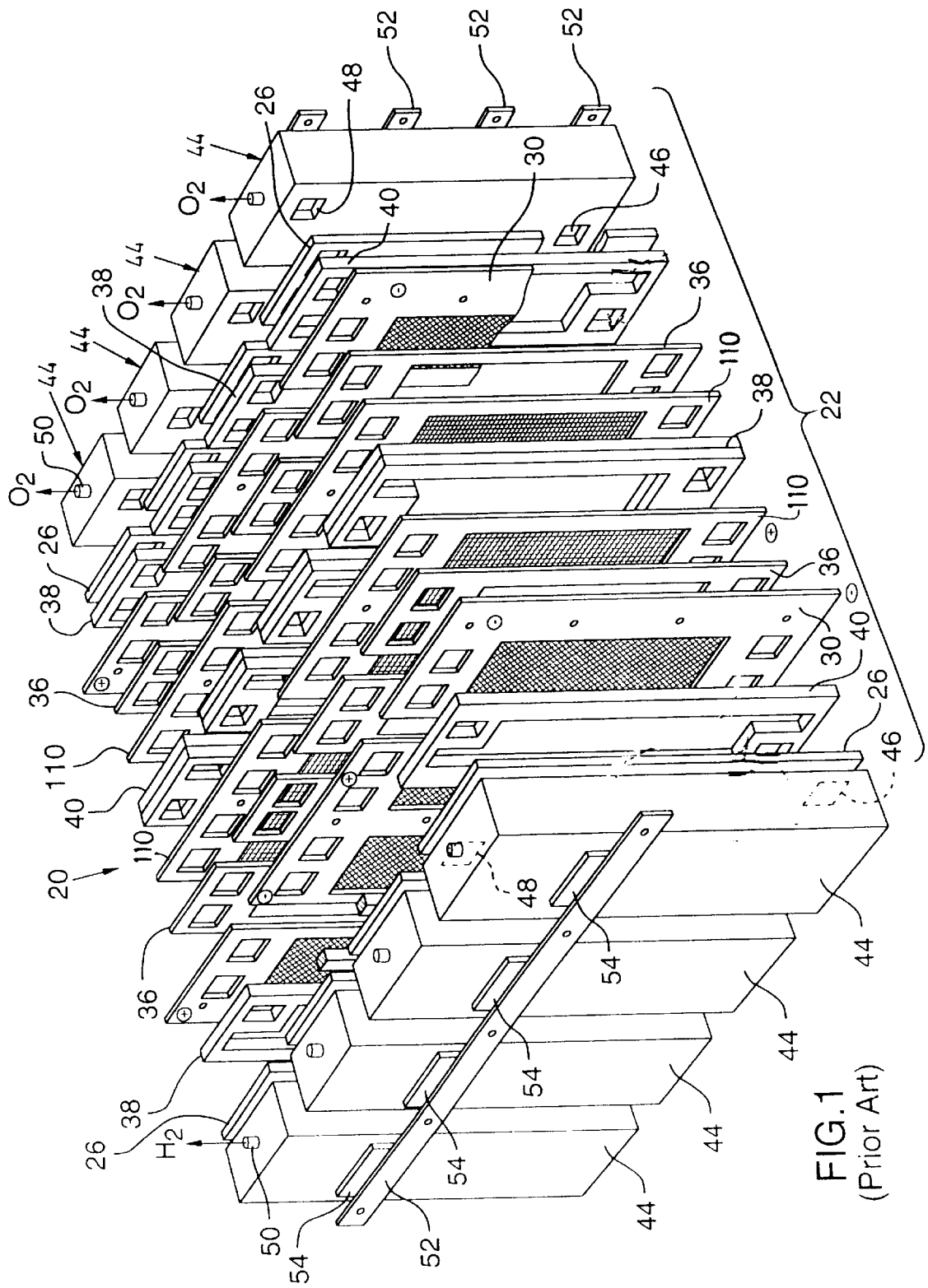
FIG. 1 is an exploded perspective view of a multiple stack electrochemical system (MSE) consisting of the series connection of four stacks consisting of two cells each connected in parallel according to the prior art.

FIG. 1 shows generally as 20 a monopolar MSE according to the prior art as embodiment in aforesaid WO98/29912.

Electrochemical system 20 is shown as a cell block comprising four cell stacks 22 with series connections between cell stacks and the two electrolysis cells of each stack connected in parallel.

Each stack 22 comprises two cells having two anodes 110 and two cathodes 30. In each compartment an anolyte frame 38 is located adjacent to anodes 110 to define an anolyte chamber and a catholyte frame 40 is located adjacent to cathodes 30 defining a catholyte chamber. Anolyte frame 38 is essentially identical in structure to catholyte frame 40 and may be generally referred to as electrolyte circulation frames.

Each anode and cathode chamber in a given cell is separated by a separator 36 to reduce mixing of the different electrolysis products, namely oxygen and hydrogen, produced in the respective anode and cathode chambers.

Electrochemical system 20 includes an end box 44 at each end of each stack 22. Referring specifically to FIG. 1, each end box 44 is provided with a lower aperture 46 and an upper aperture 48 in the side of the box in communication with the respective anolyte or catholyte chamber. A gas outlet 50 at the top of each box 44 provides an outlet for collecting the respective gas involved during the electrolysis reaction. Cell stacks 22 and entire cell block 20 are held together with sufficient force so that a fluid tight seal is made to prevent leaking of electrolyte or gases. The use of a rigid structural element such as a rectangular tube used to form end box 44 with clamping bars 52 and tie rods and associated fasteners (not shown) provides an even load distributing surface to seal the stacks 22 at modest clamping pressures. Electrically insulating panels 54 are sandwiched between the outer surfaces of end boxes 44 and clamping bars 52 in order to prevent the end boxes from being electrically connected to each other by the clamping bars.

An insulating planar gasket 26 is disposed at the end of each stack between electrolyte frames 38 or 40 and end boxes 44 for insulating the face of end box 44 from contact with electrolyte. Gasket 26 is provided with an upper aperture and a lower aperture (not shown) in registration with apertures 48 and 46, respectively, in end box 44 for fluid circulation.

It will be understood that known electrochemical systems may be modified to include the end boxes disclosed herein by way of retrofit.

For electrolysis cells used in electrosynthesis, a liquid can be fed forward from one cell block to the next cell block between adjacent boxes in order to assist conversion per pass. End boxes 44 may be manufactured form a variety of material suitable for alkaline or acid based electrochemical systems including steel, stainless steel, nickel or plastics with, if necessary, appropriate reinforcements.

Figure 2:
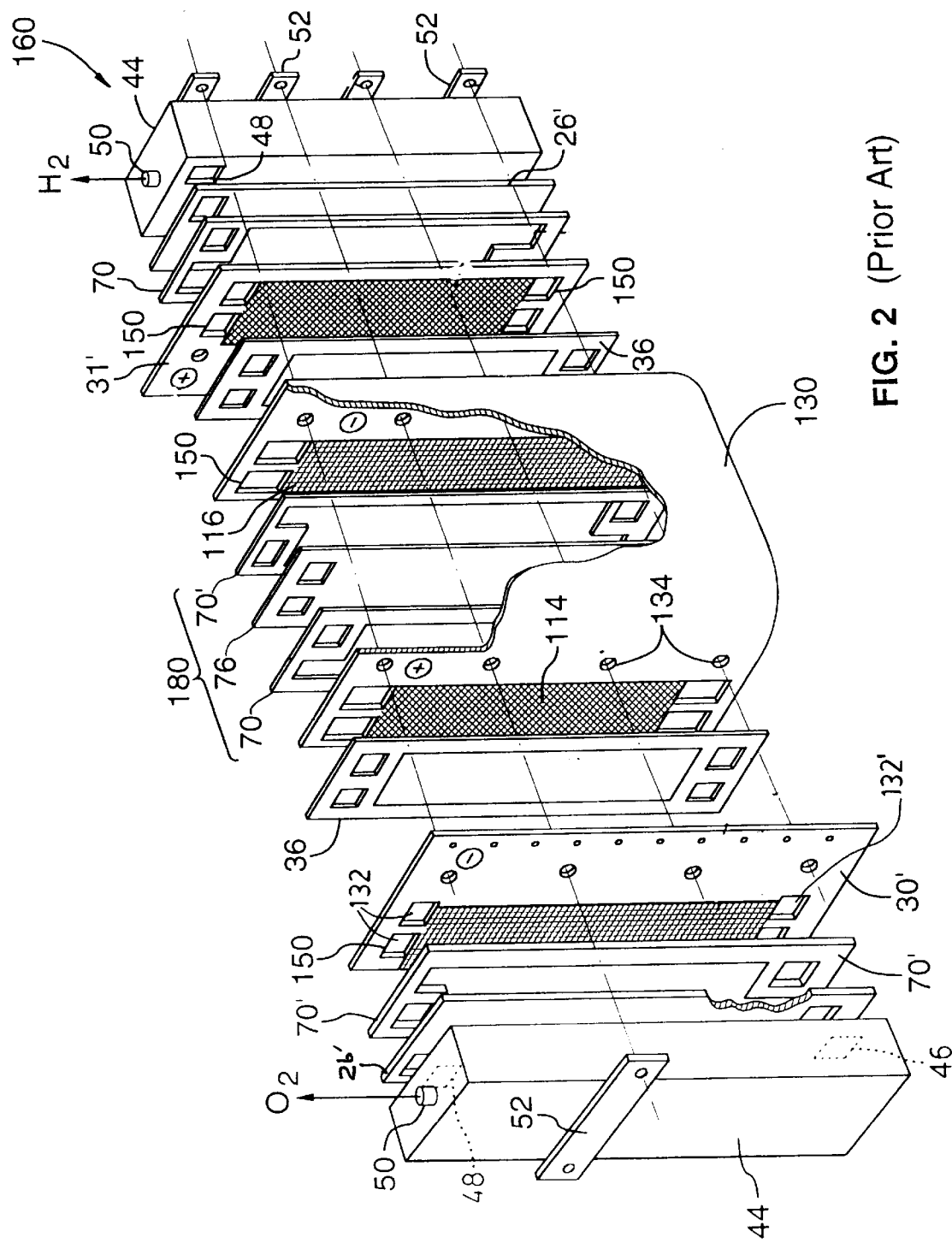
FIG. 2 is a perspective exploded view of a two cell single stack electrolyser (SSE) according to the prior art.

FIG. 2 shows a prior art configuration of an electrochemical system shown generally as 160 referred to as the single stack electrochemical system (SSE) configuration which is characterized by the fact that two or more cell compartments are placed one behind another to form a succession or "string", of cell compartments connected electrically in series. The electrical connection between cells is made using a folded double electrode plate 130 so that current passes around the edge of insulating panel constituting an end wall 76. The anolyte frames 70 and catholyte frames 70' are identical to the corresponding electrolyte frames 38 and 40 of FIG. 1. Each cell is separated from adjacent cells by an electrolyte frame assembly 180 formed by sandwiching liquid impermeable panel 76 between the two frames. External contact from the power supply (not shown) to the electrochemical system 160 is made to single plate electrodes 30' and 31'.

Electrochemical system 160 in FIG. 2 comprises two cells having one double electrode plate 130 and two single plate electrodes 30' and 31' with one being located at each end of the stack. It will be understood that for a SSE with three cells, two double electrode plates 130 would be required, for an SSE with four cells, three double electrode plates would be required and so on. An insulating panel 26' is used at the ends of the stack adjacent to the end boxes 44. Anolyte frame 70, catholyte frame 70' and inter-cell panel 76 are sandwiched between the anode section 114 and cathode section 116 in the assembled electrolyser. Double electrode plate 130 is provided with two upper apertures 132 and two lower apertures 132'. A double apertured gasket 150 is positioned in each aperture 132 and 132' to separate the anode from cathode flow channels. Double electrode plate 130 is provided with apertures 134 which form a slot 136 in the folded plate to allow clearance for the tie rods (not shown) when the SSE is assembled as in FIG. 2 before being clamped.

Figure 3:
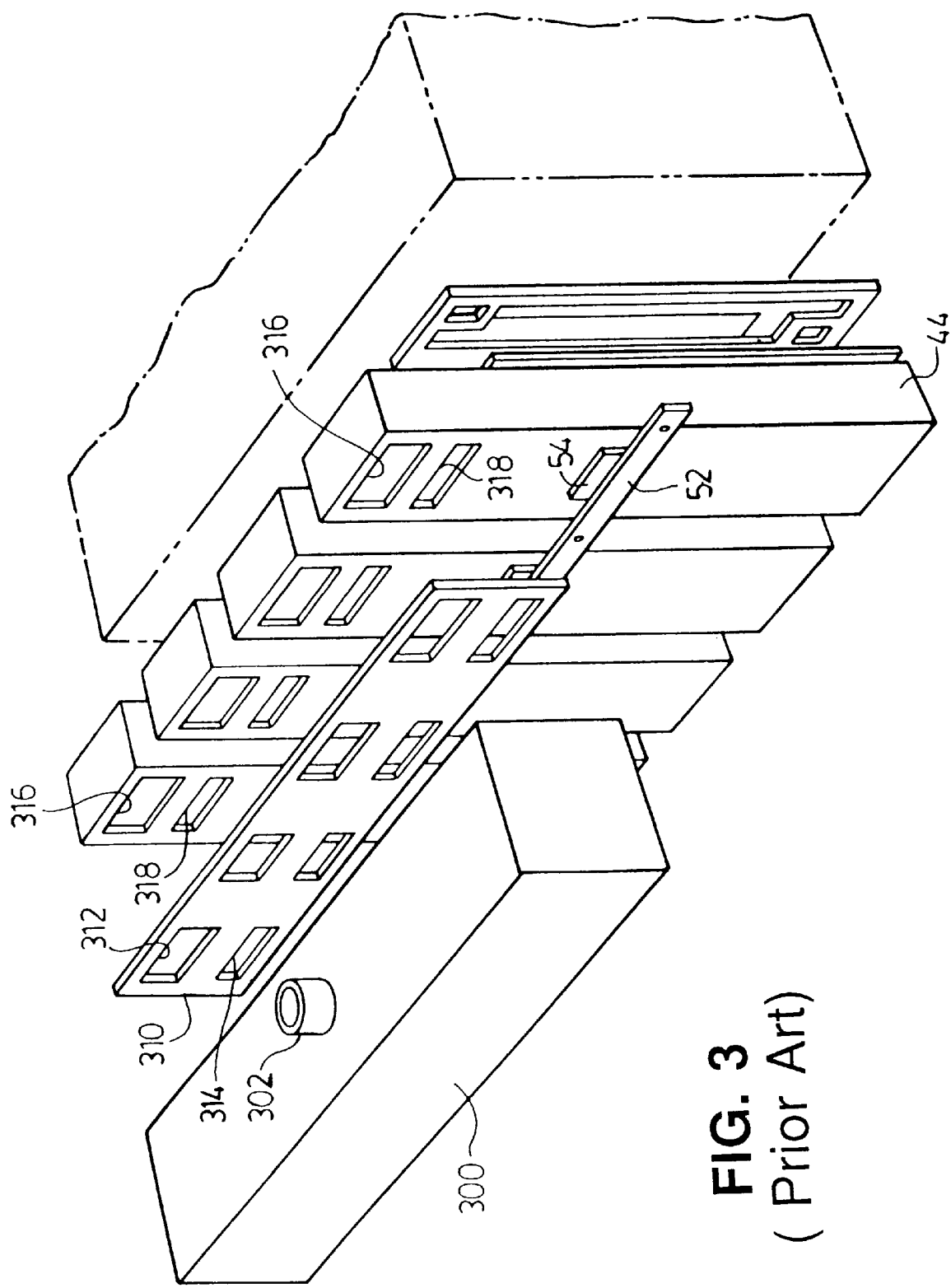
FIG. 3 is a perspective, exploded view, in part, of an MSE electrolyser having a plurality of end boxes and a header box according to the prior art.

With reference to FIG. 3, an alternative embodiment of an MSE electrolyser includes end boxes 44 adapted to be coupled to a horizontal header box 300 having a vent 302 for product gas. End boxes 44 are provided with upper and lower apertures 316 and 318 respectively. A gasket 310 with spaced pairs of upper and lower apertures 312 and 314 respectively is sandwiched between header box 300 and end boxes 44.

Figure 4:
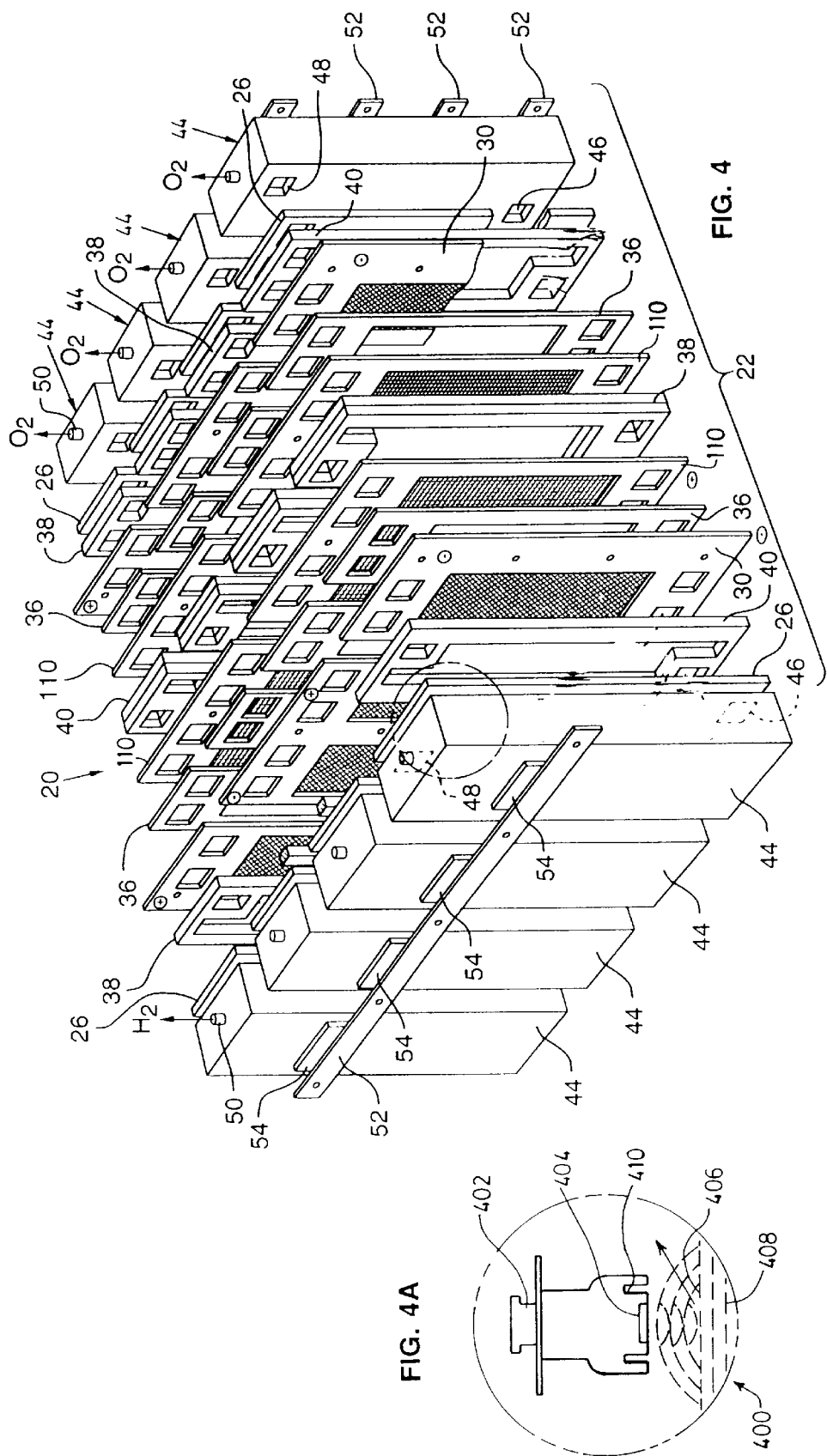
FIG. 4 (with insert FIG. 4A) is an exploded perspective view of a multiple stack electrochemical system (MSE) consisting of the series connection of four stacks consisting of two cells each connected in parallel according to the invention having an ultrasonic level sensor.

With reference now to FIG. 4 and FIG. 4A, this shows an MSE cell of FIG. 1 having an ultrasonic generator and level sensor shown generally as 400 located within end box 44 by means of screw thread 402 at the top of end box 44. Generator/sensor 400 provides a sound wave via a direct mechanical vibration or via an induced mechanical vibration by conversion of an electrical signal into a mechanical displacement by means of piezoelectric unit 404. Unit 404 generates a source signal which is reflected from surface 406 of electrolyte 408 and detected by sensing ring 410. The frequency, amplitude and phase shift between the source and return signal can be used to compute the liquid level within ±2 cm of the selected set point.

Figures 5, 5A:
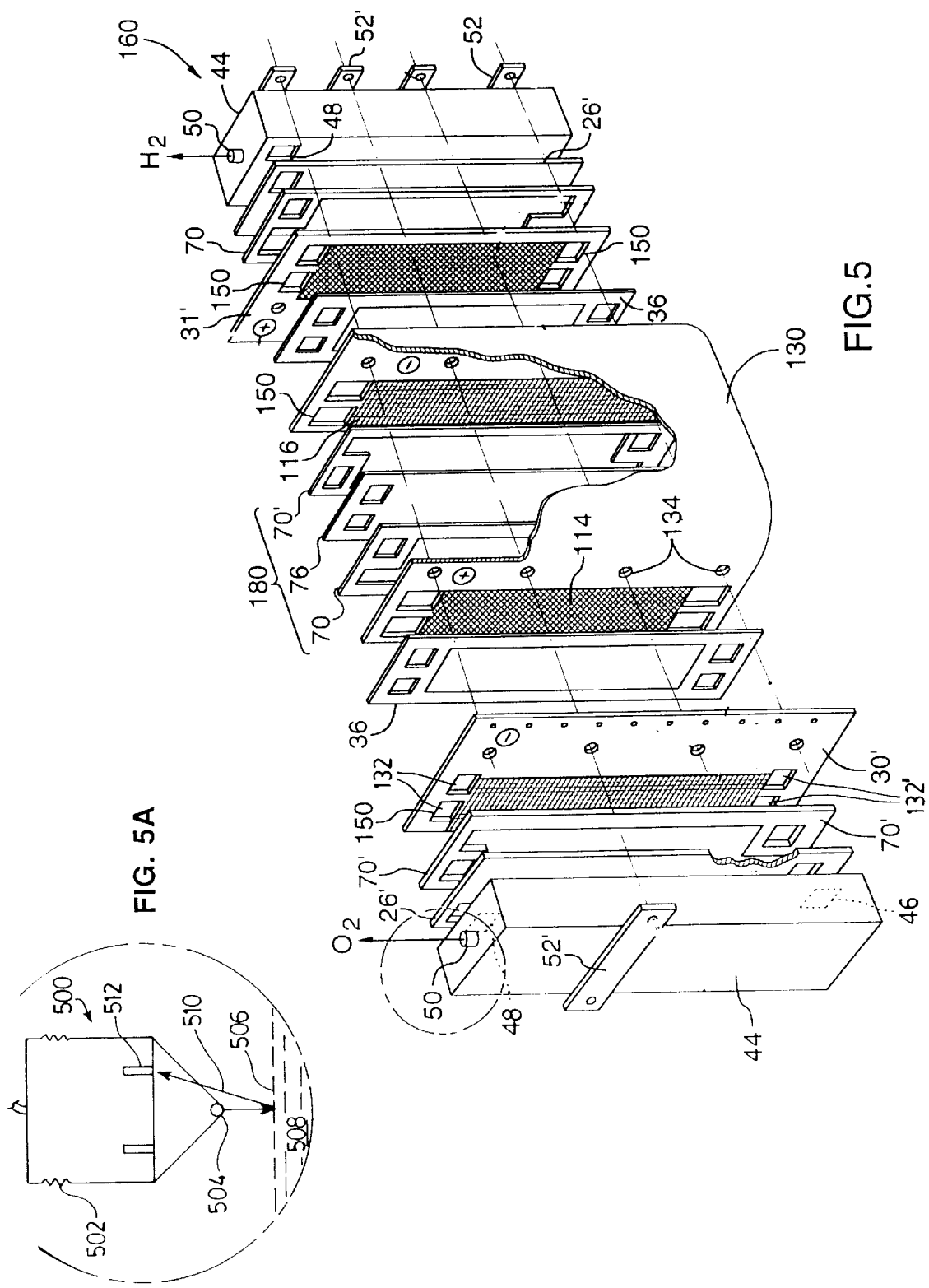
FIG. 5 (with insert FIG. 5A) is perspective exploded view of a two cell single stack electrolyser (SSE) according to the invention having an optical sensor.

With reference to FIG. 5, this shows an optical level sensor generally as 500 retained in the SSE of FIG. 2 by screw-threads 502. Level sensor 500 generates a fine, coherent source of light of a given wavelength which is transmitted from lower tip 504 to a reflecting surface 506 through electrolyte 508. The refracted beam 510 is detected by a photomultiplier 512. The frequency, wavelength, intensity, phase shift and refraction of the light beam is used to compute the liquid level on a continuous basis.

Figure 6:
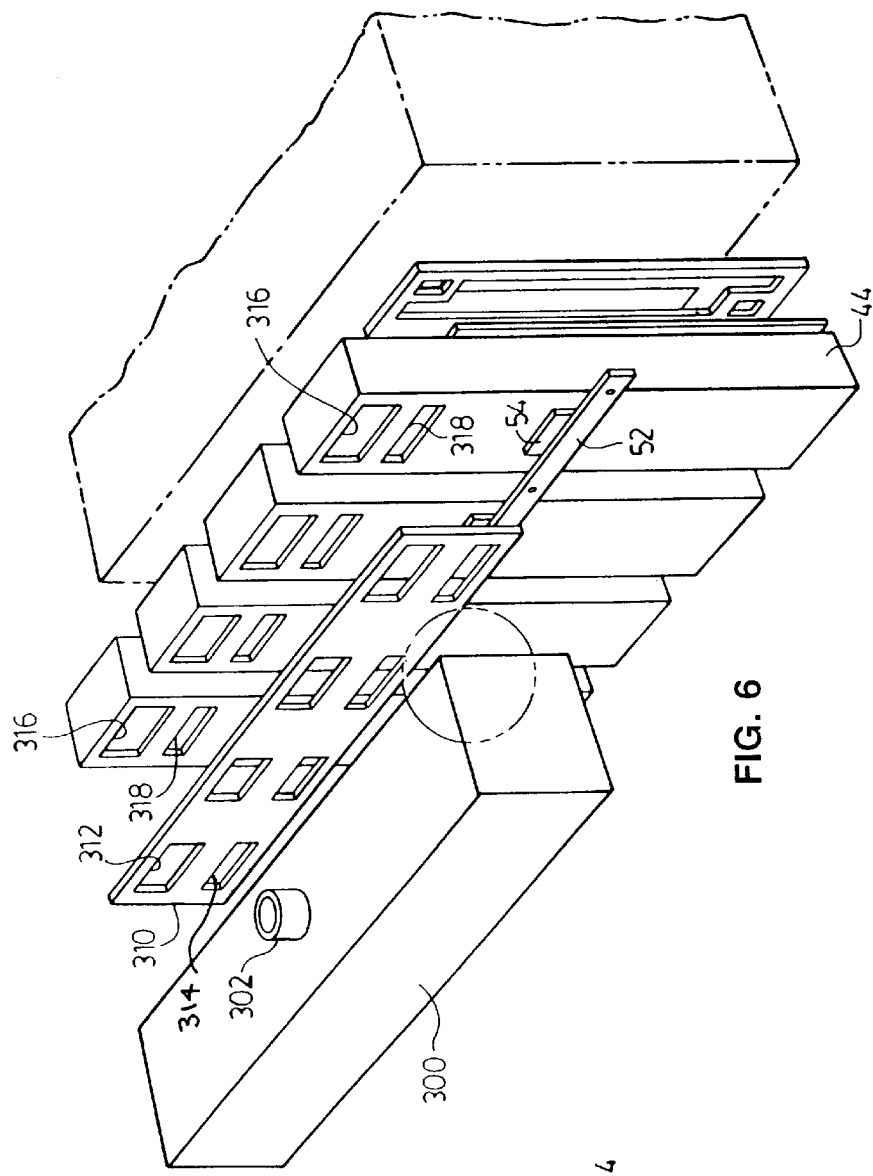
FIG. 6 (with insert FIG. 6A) is a perspective, exploded view, in part, of an MSE electrolyser having a plurality of end boxes and a header box according to the invention having an electrical/electromagnetic sensor.
Figure 6A:
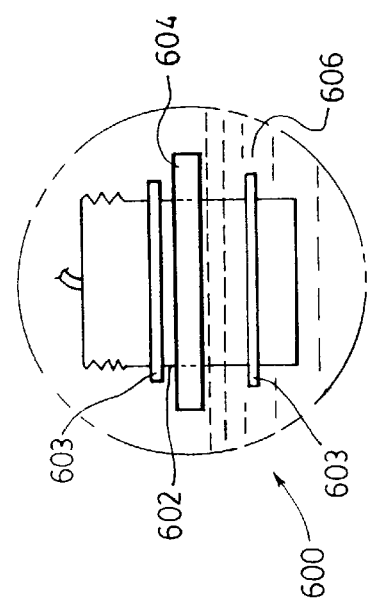

FIG. 6 shows the header box 300 of FIG. 3 having an electrical/electromagnetic sensor shown generally as 600. Sensor 600 comprises a float/reed switch having a right-vertical cylindrical body 602 having an electromagnetic core retained between rings 603 and a float 604 having a density of less than that of electrolyte 606.

Float 604 moves up and down on the electrolyte surface with a change in the electrolyte level so as to translate the relative position of float 604 with central body 602. Either float 604 or body 602 can act as the primary and/or secondary pole of a magnet. The relative displacement yields a charge in the magnetic field (flux) which is sensed and converted to an electric signal to reflect the liquid level.

Figures 7, 7A:
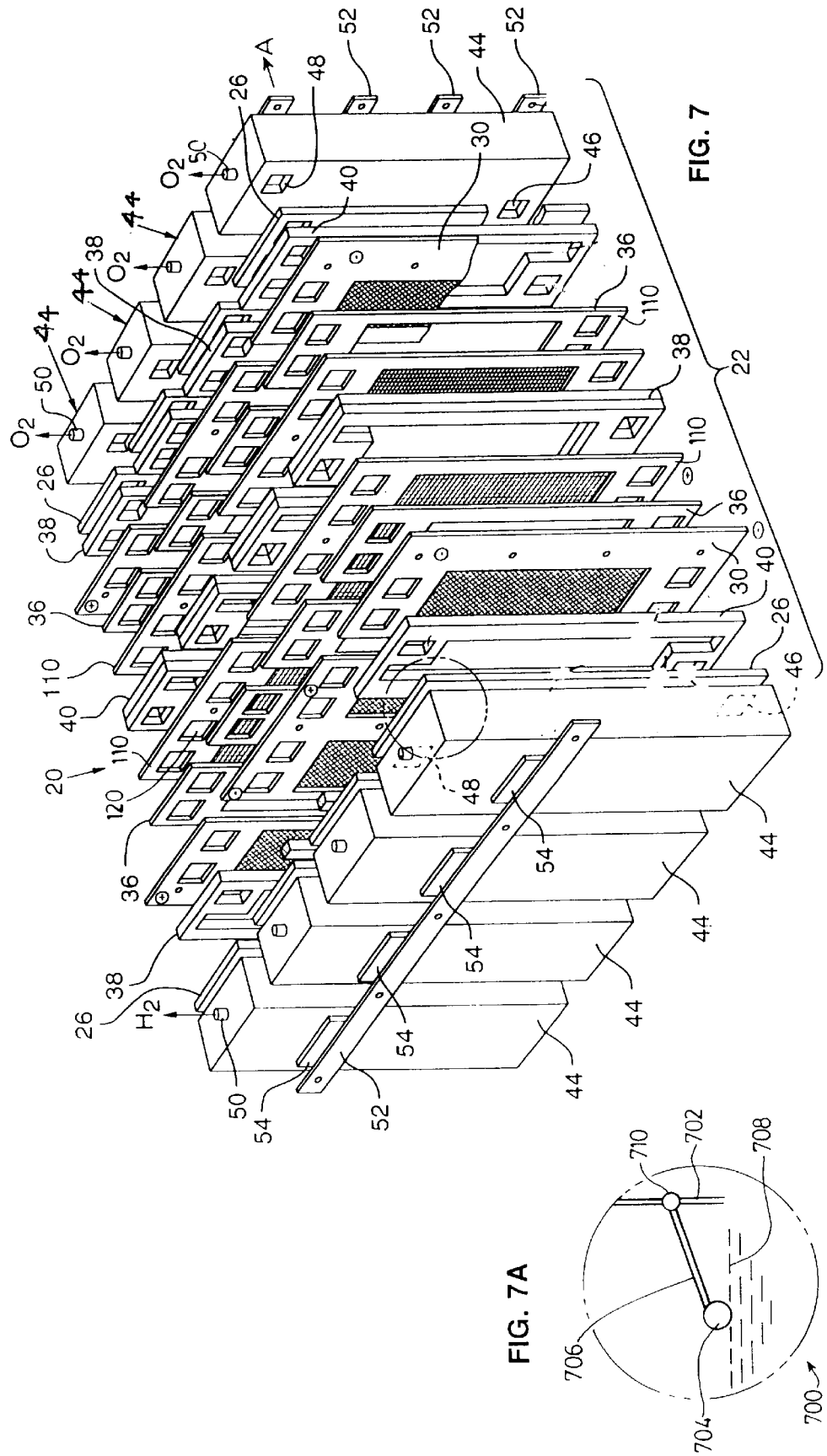
FIG. 7 (with insert FIG. 7A) is an exploded perspective view of a multiple stack electrochemical system (MSE) consisting of the series connection of four stacks consisting of two cells each connected in parallel according to the invention having a mechanical float liquid level detector.

FIG. 7 shows the end box 44 of FIG. 1 having a mechanical level ball cock sensor shown generally as 700 affixed to end box 44 at an upper part of wall 702. Sensor 700 has a float 704 and lever 706. Changes in the electrolyte level 708 translate into changes in the position of float 704 through a defined arc, such that its relative position can be determined by an electrical or mechanical transducer 710 so as to reflect the electrolyte level.

Figure 8:
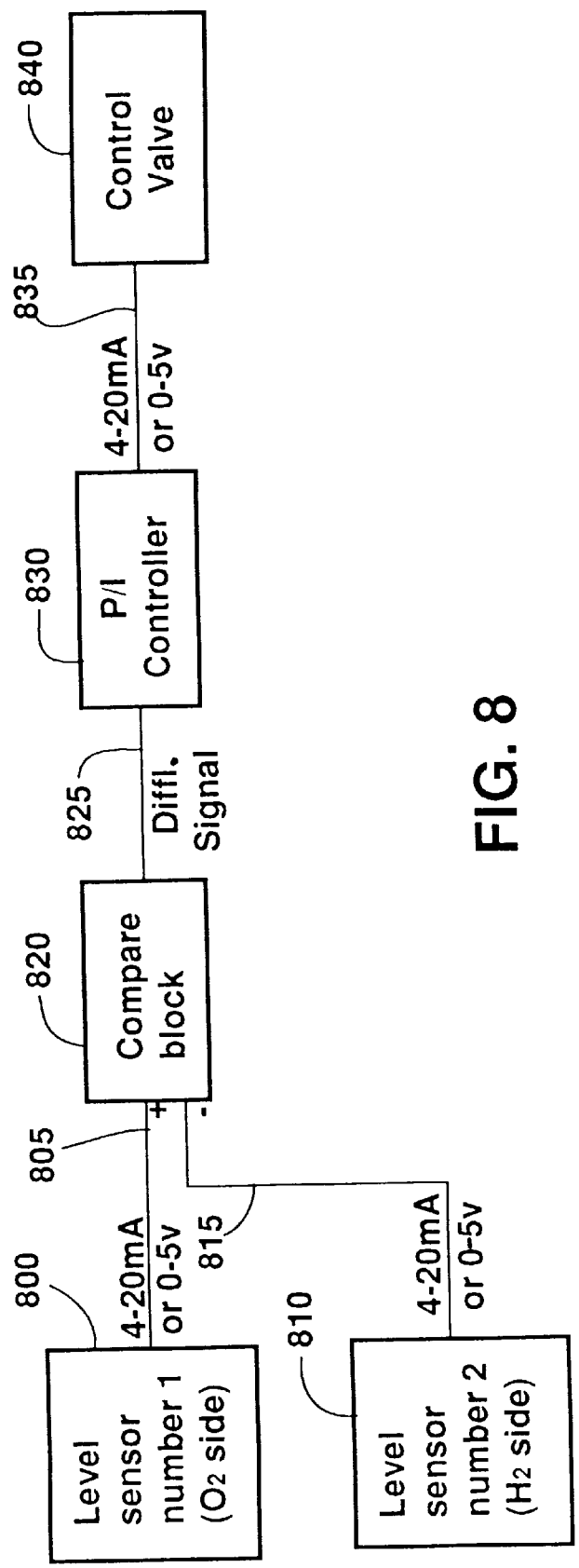
FIG. 8 is a logic block diagram of the direct level control sensor logic illustrating detection, control and adjustment features of use in one embodiment according to the invention; and wherein the same numerals denote like parts.

With reference to FIG. 8, level sensor number 1, shown as 800 is suitably positioned in the anolyte portion of the cell to detect, measure and determine the instantaneous value of the anolyte level in the cell. Sensor 800 provides a data signal output proportional to the magnitude of the anolyte level in the form of either a current ( 4–20 mA) or voltage (0–5V) signal along line 805. Simultaneously, level sensor number 2, shown as 810 is positioned in the catholyte portion of the cell to detect, measure and determine the instantaneous value of the catholyte level in the cell and provides a data signal output proportional to the magnitude of the level in the form of either a current( (4–20 mA) or voltage (0–5V) signal along line 815.

Data flowing along data conduit 805 from anolyte level sensor 800 along with data flowing along data conduit 815 from catholyte level sensor 810 arrives at a block comparison unit 820. Each signal is processed in an algorithm to provide an equivalent level value and the differential value of the signal, if any, is determined in unit 820. The magnitude and sign of the differential value is computed and compared to some minimal acceptable range determined by the safe and functional operation of the electrolyser. If the magnitude and sign of the differential signal as determined by block unit 820 exceeds or falls below the minimal acceptable range, the differential signal is passed along data conduit 825 to process and instrumentation (P/I) controller 830. Depending on both the sign and magnitude of the differential signal, P/I controller 830 transmits a data control signal in the form of either current (4–20 mA) or voltage (0–5V), along data conduit 835 to control valve 840 so as to change the status of control valve 840 in such a fashion as to either open or close to minimize the magnitude of the differential signal effecting a change in level of either the anolyte or catholyte.

Although this disclosure has been described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. An improved process for providing hydrogen from an electrolytic cell having:
   an anolyte solution having an anolyte liquid level;
   a catholyte solution having a catholyte liquid level;
   generating oxygen at an oxygen pressure above said anolyte level;
   generating hydrogen at a hydrogen pressure above said catholyte level; the improvement comprising
   (a) detecting at least one of said anolyte and said catholyte liquid levels as anolyte level and catholyte level data;
   (b) feeding said level data to central processing means;
   (c) determining the pressure differential between said levels from said level data, and pressure adjustment data by said central processing means; and
   (d) providing said adjustment data to pressure control means to maintain said pressure differential within a selected range.

2. A process as defined in claim 1 comprising continuously sequentially carrying out steps (a)–(d).

3. A process as defined in claim 1 wherein said pressure differential is submitted to an algorithmic treatment by said central processing means to determine said pressure adjustment data to better define said adjustment data.

4. A process as defined in claim 1 comprising detecting said anolyte level and detecting said catholyte level.

5. A process as defined in claim 1 comprising said control means changing at least one of said oxygen and said hydrogen pressures to effect said adjustment of said pressure differential.

6. A process as defined in claim 5 comprising changing the oxygen pressure relative to said hydrogen pressure to effect said adjustment in said pressure differential.

7. A process as defined in claim 6 comprising varying the oxygen outtake flow from above said anolyte level.

8. A process as defined in claim 5 comprising changing the hydrogen pressure relative to said oxygen pressure to effect adjustment in said pressure differential.

9. A process as defined in claim 1 wherein said detection comprises optically detecting said liquid level.

10. A process as defined in claim 1 wherein said detection comprises effecting an electrical characteristic detection of said liquid level.

11. A process as defined in claim 1 wherein said detection comprises detecting the height of a floating member on said liquid.

12. A process as defined in claim 1 wherein said detection comprises detecting an electromagnetic characteristic change in consequence of a change in said liquid level.

13. A process as defined in claim 1 wherein said detection comprises detecting an ultrasonic characteristic change in consequence of a change in said liquid level.

14. An improved electrolytic cell for the production of hydrogen comprising
   an anolyte solution having an anolyte liquid level;
   a catholyte solution having a catholyte liquid level;
   generated oxygen at an oxygen pressure above said anolyte level;
   generated hydrogen at a hydrogen pressure above said catholyte level;
   the improvement comprising
   (i) detection means for detecting at least one of said anolyte and said catholyte levels as anolyte level data and catholyte level data;
   (ii) control processing means;
   (iii) means for feeding said level data to said central processing means to determine the pressure differential between said levels from said level data, and pressure adjustment data; and
   (iv) pressure control means to receive said adjustment data and adjust at least one of said oxygen pressure and hydrogen pressure to maintain said pressure differential within a selected range.

15. A cell as defined in claim 14 wherein said central processing means comprises algorithmic treatment for treating said pressure differential to provide said adjustment data.

16. A cell as defined in claim 14 comprising anolyte level detection means and catholyte level detection means.

17. A cell as defined in claim 14 wherein said pressure control means comprises means for changing the oxygen pressure relative to said hydrogen pressure.

18. A cell as defined in claim 14 wherein said detection means comprises optical detection means.

19. A cell as defined in claim 14 wherein said detection means comprises an electrical characteristic detection means.

20. A cell as defined in claim 14 wherein said detection means comprises means for determining the height of a floating member on at least one of said anolyte liquid and said catholyte liquid.

21. A cell as defined in claim 14 wherein said detection means comprises electromagnetic generation and measurement means.

22. A cell as defined in claim 14 wherein said detection means comprises ultrasonic generation and measurement means.

* * * * *